(12) United States Patent
Krell

(10) Patent No.: US 11,660,688 B2
(45) Date of Patent: May 30, 2023

(54) ULTRASONIC MACHINING APPARATUS

(71) Applicant: MS Ultraschall Technologie GmbH, Spaichingen (DE)

(72) Inventor: Volker Krell, Neuhausen (DE)

(73) Assignee: MS Ultraschall Technologie GmbH, Spaichngen (DE)

( * ) Notice: Subject to any disclaimer, the term of this patent is extended or adjusted under 35 U.S.C. 154(b) by 267 days.

(21) Appl. No.: 17/011,963

(22) Filed: Sep. 3, 2020

(65) Prior Publication Data
US 2021/0069804 A1 Mar. 11, 2021

(30) Foreign Application Priority Data
Sep. 5, 2019 (DE) .......................... 102019123786.6

(51) Int. Cl.
| | | |
|---|---|---|
| *B29C 65/08* | (2006.01) | |
| *B23C 9/00* | (2006.01) | |
| *B23C 3/13* | (2006.01) | |
| *B23K 20/10* | (2006.01) | |
| *B23K 37/00* | (2006.01) | |

(52) U.S. Cl.
CPC .................. *B23C 9/00* (2013.01); *B23C 3/13* (2013.01); *B23K 20/106* (2013.01); *B23K 37/00* (2013.01); *B29C 65/08* (2013.01); *B23C 2270/022* (2013.01)

(58) Field of Classification Search
CPC ............................. B23K 20/106; B29C 65/08
USPC ........................................................ 156/580.1
See application file for complete search history.

(56) References Cited

U.S. PATENT DOCUMENTS

2004/0050474 A1\* 3/2004 Kubik ............... B29C 66/83411
156/367

FOREIGN PATENT DOCUMENTS

| DE | 10331064 A1 | 2/2005 |
| DE | 102016112757 A1 | 1/2018 |
| DE | 102016116429 A1 | 3/2018 |
| EP | 1854618 A1 | 11/2007 |

OTHER PUBLICATIONS

Demers, "Fatigue strength degradation of E-glass FRP composites and carbon FRP composites," Construction and Building Materials, vol. 12, 1998, pp. 311-318.
European Search Report for related European Application No. 0188334.5, dated Jan. 15, 2021, 4 pages.

\* cited by examiner

*Primary Examiner* — James D Sells
(74) *Attorney, Agent, or Firm* — Dickinson Wright PLLC

(57) ABSTRACT

In an ultrasonic machining apparatus having leaf springs composed of fiber-reinforced plastic, the leaf springs are provided with a reinforcement in the region of a clamping.

16 Claims, 2 Drawing Sheets

Figure 1:
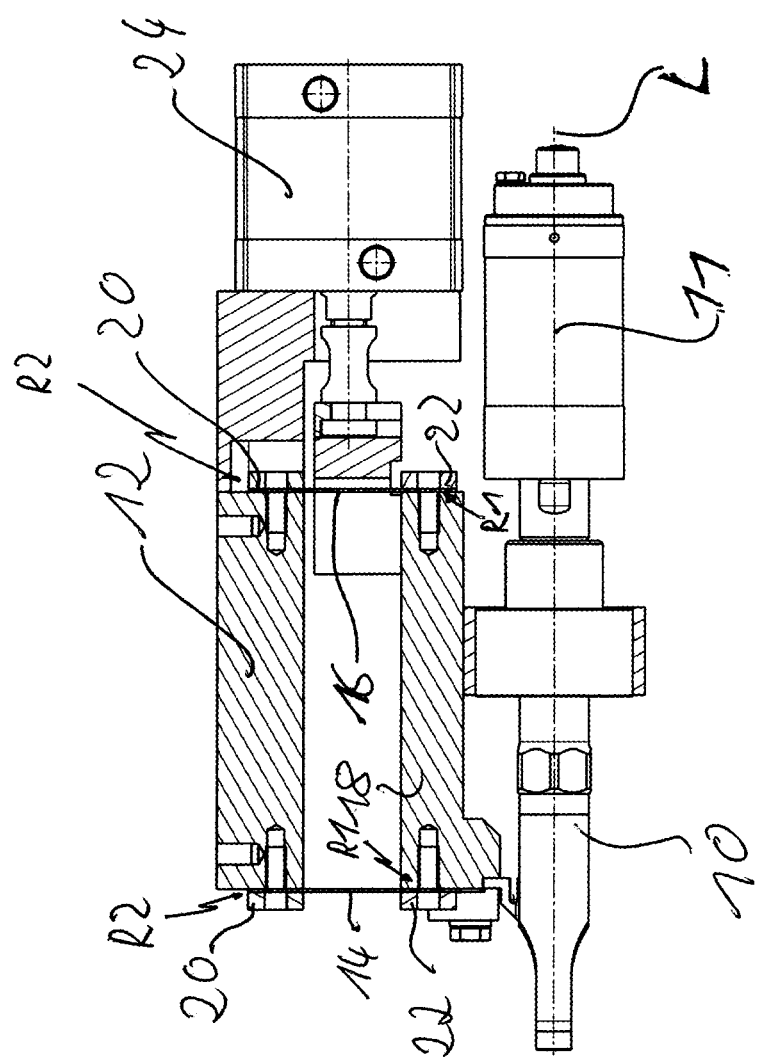

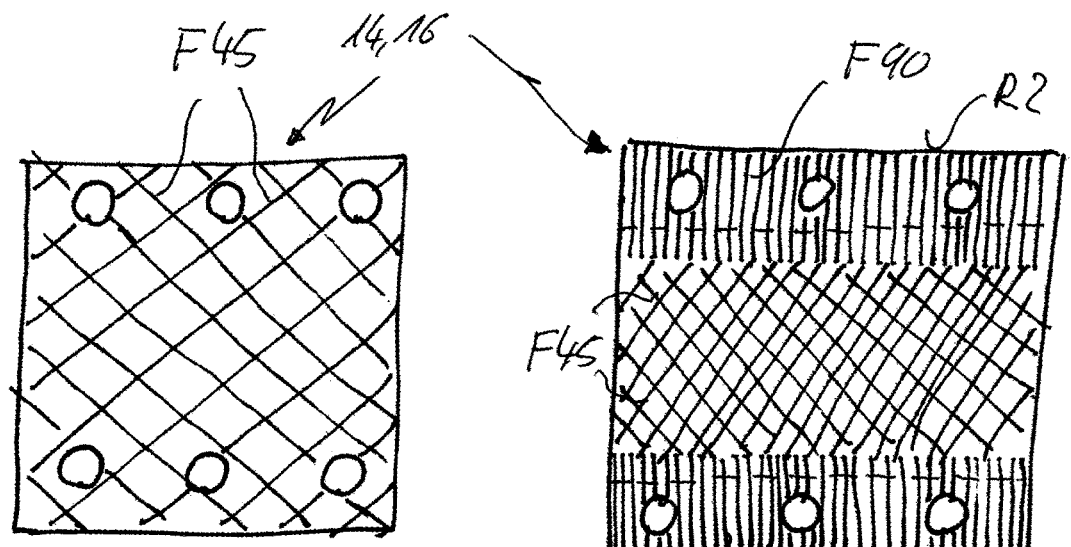
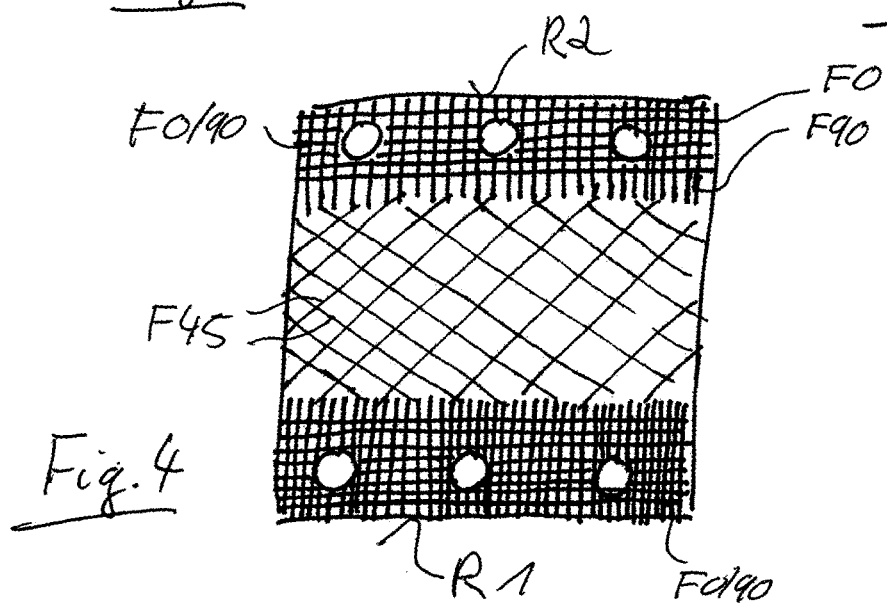
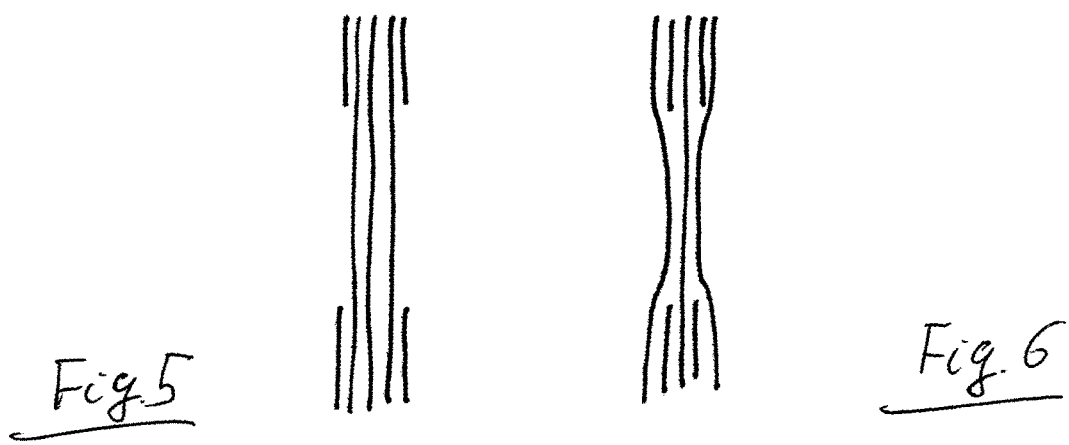

ULTRASONIC MACHINING APPARATUS

The present invention relates to an ultrasonic machining apparatus comprising a sonotrode that is displaceably supported on a base in a longitudinal direction, wherein the support comprises at least two leaf springs that are clamped at two oppositely disposed sides, that are manufactured from fiber-reinforced plastic, and that connect the sonotrode to the base in an articulated manner. Such an apparatus is, for example, known from DE 103 31 064 A1.

The sonotrode can be displaced relative to the base with the aid of a control element, wherein a clearance-free guidance can be achieved by the support and low forces are simultaneously sufficient for a required stroke movement. The displacement of the sonotrode relative to the base indeed takes place at a comparatively small stroke, but at a high repetition frequency, whereby the leaf springs are subject to a great load in long-term operation.

It is therefore the object of the present invention to provide an comprising a sonotrode that is displaceably supported on a base in a longitudinal direction, wherein the support comprises at least two leaf springs that are clamped at two oppositely disposed sides, that are manufactured from fiber-reinforced plastic, and that connect the sonotrode to the base in an articulated manner, with the apparatus having an improved service life.

This object is satisfied by the features of claim 1 and in particular in that the leaf springs are manufactured from carbon fiber-reinforced plastic and have an anisotropically distributed modulus of elasticity.

It has namely been found through examinations that the region of the leaf spring directly next to the clamping is subject to a strong alternating load in permanent operation so that cracks up to a break can occur in the material of the leaf springs. The modulus of elasticity can be varied in different load directions due to the manufacture of the leaf springs from carbon fiber-reinforced plastic provided in accordance with the invention and due to the anisotropic distribution of the modulus of elasticity of the leaf springs.

Advantageous embodiments of the invention are described in the description, in the drawing, and in the dependent claims.

If the modulus of elasticity is lower in the direction of the thickness of the leaf springs than transversely thereto, a particularly good adaptation to the application can be achieved with ultrasonic machining apparatus since it can occur with such apparatus that the sonotrode tilts slightly after a displacement in the direction of a workpiece to be welded so that comparatively high bending stresses occur in the direction of the plane of the leaf springs. In contrast, the stiffness of the leaf spring should be low in the direction of deflection, i.e. in the longitudinal direction.

An anisotropic distribution of the modulus of elasticity can be advantageously achieved in that the leaf springs have carbon fibers that are oriented at an angle of 45° to the four sides of the leaf spring.

The bending stresses that occur can be considerably reduced or distributed if a reinforcement is provided in the region of the clamping or due to a targeted thickening in the region of the clamping.

In accordance with a further advantageous embodiment, the reinforcement can decrease in the direction of the center of the leaf spring, wherein a uniform decrease in the direction of the center of the leaf spring can in particular be advantageous. This means that the leaf spring is thicker at two oppositely disposed margins than at its center. A design of the reinforcement of such a kind that a constant distribution of the bending stress is adopted over the total length of the resilient region can be particularly advantageous here.

In accordance with a further advantageous embodiment, the reinforcement can be formed by additional fiber layers since the modulus of elasticity in the region of the clamping can be varied by such additional fiber layers.

In accordance with a further advantageous embodiment, the reinforcement can have fiber layers having different orientations since the modulus of elasticity can hereby also be set differently in different load directions. Thus, it is, for example, possible to cover the actual leaf spring with fiber layers at an angle of, for example, 45°, wherein a certain number of layers, for example two to seven layers, are layered on one another, with, optionally, two or four reinforcement layers additionally being able to be inserted into the marginal region to which the leaf spring is clamped.

In accordance with a further advantageous embodiment, the reinforcement can have fiber layers whose number of fibers per unit area varies and in particular decreases in one direction, namely in the direction of the center between the two clampings. Optimized cross-sections can hereby also be achieved.

If the leaf spring has unidirectional fiber layers, a reinforcement region can be formed by fiber layers having different lengths. If fiber layers having fibers at 0° and 90° are used, a particularly uniform transition can be made possible by removing some 90° fibers.

In accordance with a further advantageous embodiment, fiber layers of the reinforcement can be embedded between fiber layers. Good results have also been found when the fiber layers of the reinforcement represent the outermost fiber layers of the leaf spring.

It can also be advantageous if the two leaf springs are not preloaded since the forces required for a deflection are minimized in this case.

In accordance with a further advantageous embodiment, at least one leaf spring can be fixed in a form-fitted manner in the region of a clamping. For this purpose, pins or feather keys can, for example, be provided that establish a form-fitted connection between the clamping and the leaf spring to achieve a secure fixing of the leaf spring even if it changed its outer contour, i.e. its dimensions or its inner properties, after a longer period of operation. A form-fitted connection between the leaf spring and the clamping can also be achieved by a fitting screw that is inserted through an opening in the leaf spring in a clearance-free manner. Furthermore, it can be advantageous if a special design of the fiber arrangement takes place around such an opening of the leaf spring to take up possible shear stresses in different directions. For this purpose, it can, for example, be advantageous if the fibers are arranged at 0°, 45°, and 90° in the region of the opening for the form-fitted fixing of the leaf spring. A ring-shaped arrangement of the fibers around the opening or a combination with such an arrangement can also be advantageous.

The present invention will be described in the following by way of example with reference to advantageous embodiments and to the enclosed drawings.

There are shown:

FIG. 1 a partly sectioned side view of an ultrasonic machining apparatus;

FIG. 2 an illustration of a leaf spring with a fiber layer of carbon fibers;

FIG. 3 an illustration of fiber layers of a leaf spring with a reinforcement;

FIG. 4 a further illustration of a leaf spring with fiber layers and a reinforcement;

FIG. 5 a sectional view through an embodiment of fiber layers with a reinforcement; and FIG. 6 a sectional view of a further embodiment of fiber layers with a reinforcement.

FIG. 1 shows an ultrasonic machining apparatus that has a sonotrode 10 that is displaceably supported on a base 12 in a longitudinal direction, i.e. in the direction of the longitudinal axis L of the sonotrode 10. In the embodiment shown, the support is solely composed of two leaf springs 14 and 16 that are rectangular or square in design and that are each clamped at two oppositely disposed marginal regions R1 and R2 to a support part 18, on one side, and to the base 12, on the other side. The support part 18 is connected to the sonotrode 10 that is in turn connected to a converter 11.

The clamping of each leaf spring 14 and 16 takes place at the two oppositely disposed sides R1 and R2 with the aid of a bolt 20, 22 that is, for example, screwed to the base 12 or to the support part 18 via three bolts (not shown).

As FIG. 1 further shows, a short stroke cylinder 24 is fastened to the base 12 and the support part 18 can be displaced in parallel with the base 12 in the direction of the longitudinal axis L with the aid of said short stroke cylinder 24 (due to the short strokes), wherein the two leaf springs 14 and 16 establish an articulated connection between the base 12 and the support part 18.

The two leaf springs 14 and 16 optionally have a reinforcement, not shown in FIG. 1, in the region of the clamping, i.e. in the region of the bolts 22 and 24, said reinforcement being able to extend into a region between the two clampings or bolts 20 and 22.

FIG. 2 schematically illustrates a plan view of a leaf spring 14 or 16 in accordance with the invention that has a respective three openings for a passing through of the screw bolts at its two oppositely disposed sides. In the embodiment shown, the leaf spring is manufactured from carbon fiber-reinforced plastic since carbon fibers have a modulus of elasticity similar to steel. The modulus of elasticity can be varied in different load directions by a specific fiber orientation in the regions of the clamping.

In the embodiment shown in FIG. 2, a carbon fiber fabric is provided in the leaf spring for this purpose and has fibers F45 that are oriented at an angle of 45° to the four margins of the leaf spring, wherein a plurality of layers can be layered on one another, for example, two to seven layers having an accumulated total weight per unit area of e.g. 500-700 g/m².

To form a reinforcement in the marginal region R1 and R2, i.e. in the region of the clamping by the bolts 20 and 22, a reinforcement of the leaf spring can optionally be formed, which is illustrated in FIG. 3. In addition to the fiber layers F45 laid at 45°, two or four additional reinforcement layers F90 are, for example, provided in the marginal regions R1 and R2; they are designed as a unidirectional fabric in the embodiment shown and are oriented at an angle of 90° to the adjacent margins of the leaf spring. The additional fiber layers F90 in this respect extend beyond the clampings or bolts represented by a dotted line in the direction of a region between the two clampings.

FIG. 4 illustrates a further embodiment of leaf springs 14 or 16 in which the leaf spring is in turn formed by fiber layers F45. Additional fibers F0/90, whose fibers extend at an angle of 0 and 90° to the margins of the leaf spring, are worked into the end regions of the leaf spring for reinforcement. As FIG. 4 illustrates in this respect, the number of fibers per unit area varies from the fiber layers F0/90. More precisely, the number of fibers per unit area decreases in the direction of the center of the leaf spring since some of the F0 fibers are removed in this direction that are oriented at an angle of 0° to the two clamping margins R1 and R2.

FIG. 5 and FIG. 6 show a kind of cross-sectional view through the different fiber layers of a leaf spring with a reinforcement. In this respect, in the embodiment of FIG. 5, reinforcement layers are applied from the outside to inner fiber layers of the leaf spring. In the embodiment of FIG. 6, the reinforcement layers are each located between an outer fiber layer and an inner fiber layer.

The invention claimed is:

1. An ultrasonic machining apparatus comprising a sonotrode that is displaceably supported on a base in a longitudinal direction, wherein the support comprises at least two leaf springs that are clamped at two oppositely disposed sides, that are manufactured from fiber-reinforced plastic, and that connect the sonotrode to the base in an articulated manner,
    wherein the leaf springs are manufactured from carbon fiber-reinforced plastic and have an anisotropically distributed modulus of elasticity, and
    wherein the leaf springs are provided with a reinforcement in the region of the clamping.

2. The apparatus in accordance with claim 1,
    wherein the modulus of elasticity is lower in the direction of the thickness of the leaf springs than transversely thereto.

3. The apparatus in accordance with claim 1,
    wherein the leaf springs have carbon fibers that are oriented at 45° to the sides of the leaf spring.

4. The apparatus in accordance with claim 1,
    wherein the reinforcement decreases in the direction of the center of the leaf spring.

5. The apparatus in accordance with claim 1,
    wherein the reinforcement decreases uniformly in the direction of the center of the leaf spring.

6. The apparatus in accordance with claim 1,
    wherein the reinforcement is formed by additional fiber layers.

7. The apparatus in accordance with claim 1,
    wherein the reinforcement has fiber layers having different orientations.

8. The apparatus in accordance with claim 1,
    wherein the reinforcement has fiber layers whose number of fibers per unit area varies.

9. The apparatus in accordance with claim 8,
    wherein the number of fibers per unit area of the fiber layers decreases in one direction.

10. The apparatus in accordance with claim 1,
    wherein the reinforcement has unidirectional fiber layers having different lengths.

11. The apparatus in accordance with claim 1,
    wherein fiber layers of the reinforcement are arranged below an outermost fiber layer.

12. The apparatus in accordance with claim 1,
    wherein fiber layers of the reinforcement are embedded between fiber layers.

13. The apparatus in accordance with claim 1,
    wherein the reinforcement extends into a region between the two clampings.

14. The apparatus in accordance with claim 1,
    wherein the leaf springs are not preloaded.

15. The apparatus in accordance with claim 1,
    wherein at least one of said at least two leaf springs is fixed in a form-fitted manner in the region of a clamping.

16. The apparatus in accordance with claim 1, wherein the leaf springs have at least two layers of carbon fibers having a total weight per unit area of 500-700 g/m$^2$.

* * * * *